May 24, 1960
A. ELLISON
2,937,874
ARITHMETIC GAME
Filed March 25, 1959
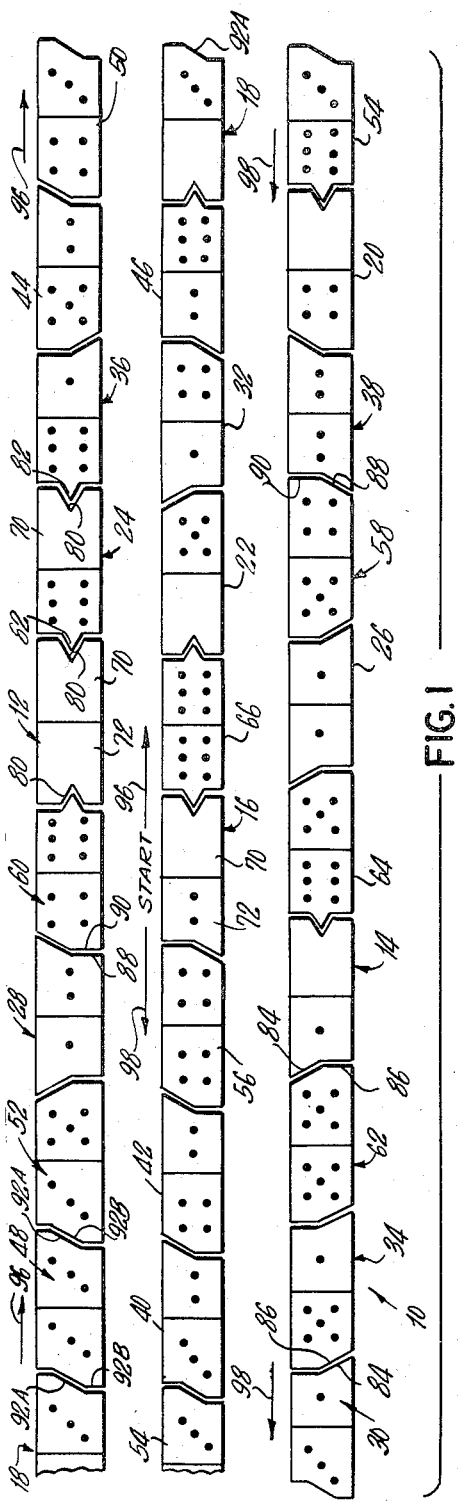
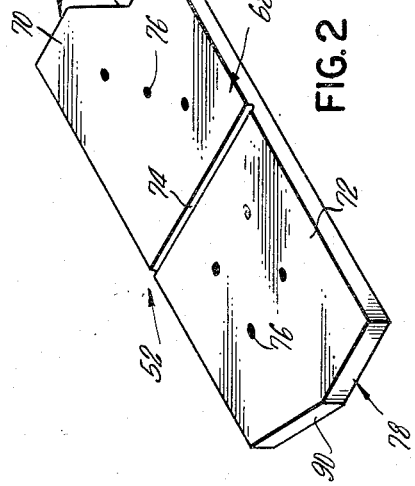
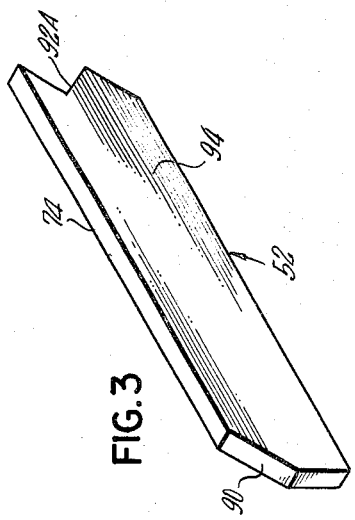
INVENTOR.
ALFRED ELLISON
BY Reuben Spencer
ATTORNEY

United States Patent Office 2,937,874
Patented May 24, 1960

2,937,874

ARITHMETIC GAME

Alfred Ellison, 1 Joseph St., New Hyde Park, N.Y.

Filed Mar. 25, 1959, Ser. No. 801,866

5 Claims. (Cl. 273—137)

The present invention relates, in general, to an educational device and, in particular, to a game for teaching the fundamentals of arithmetic.

The principal object of the present invention is to provide a means whereby a student can obtain actual practice for the purpose of learning to quickly recognize all the various combinations of quantities which make up predetermined numbers.

It is another object of the present invention to provide a game device for obtaining practice in number recognition, number components, addition, subtraction, multiplication and division.

It is a further object of the present invention to provide a means for fixing the learnings of all combinations of all numbers through ten in a manner corresponding to the current emphasis in teaching arithmetic which leads children to understand the meanings of numbers and not merely their magical manipulation.

It is a still further object of the present invention to provide an educational arithmetic game in which the game pieces are so constructed as to inhibit the child from matching the design rather than the number and in which a self-checking feature is incorporated.

Other and further objects of the present invention will be readily apparent to those skilled in the art from a reading of the following specification in connection with the annexed drawings.

In the drawings, which illustrate the best mode presently contemplated of carrying out the present invention:

Fig. 1 is a plan view of all the game pieces of one game pursuant to the present invention, with the pieces arranged as at the completion of the game;

Fig. 2 is a perspective view, on an enlarged scale, of one of the game pieces; and Fig. 3 illustrates the game piece shown in Fig. 2 standing one one side edge thereof.

Referring now to the drawings in detail, Fig. 1 illustrates a completely played-out game 10, pursuant to the present invention, for studying all arithmetic relations concerning a predetermined numeral. In the illustrated embodiment, the numeral is six. For this numeral, there is required a total of twenty-eight game pieces or tiles in the following number combinations:

$$\frac{0}{0}$$

$$\frac{0}{1} \quad \frac{1}{1}$$

$$\frac{0}{2} \quad \frac{1}{2} \quad \frac{2}{2}$$

$$\frac{0}{3} \quad \frac{1}{3} \quad \frac{2}{3} \quad \frac{3}{3}$$

$$\frac{0}{4} \quad \frac{1}{4} \quad \frac{2}{4} \quad \frac{3}{4} \quad \frac{4}{4}$$

$$\frac{0}{5} \quad \frac{1}{5} \quad \frac{2}{5} \quad \frac{3}{5} \quad \frac{4}{5} \quad \frac{5}{5}$$

$$\frac{0}{6} \quad \frac{1}{6} \quad \frac{2}{6} \quad \frac{3}{6} \quad \frac{4}{6} \quad \frac{5}{6} \quad \frac{6}{6}$$

The seven game pieces in the first vertical column are identified by the reference numerals 12, 14, 16, 18, 20, 22 and 24, respectively. The six game pieces in the second vertical volumn are identified by the reference numerals 26, 28, 30, 32, 34 and 36, respectively. The five game pieces in the third vertical column are identified by the reference numerals 38, 40, 42, 44 and 46, respectively. The four game pieces in the fourth vertical column are identified by the reference numerals 48, 50, 52 and 54, respectively. The three game pieces in the fifth vertical column are identified by the reference numerals, 56, 58 and 60. The two game pieces in the sixth vertical colmn are identified by the reference numerals 62 and 64, respectively, and the single game piece in the seventh column is identified by the single reference numeral 66.

As best shown in Figs. 2 and 3, each game piece or tile is constituted by a preferably rigid strip of any suitable material, for example and not by way of limitation, tile, wood, rubber, plastic, cardboard, fiberboard, leather, composition material, etc. The front face or surface 68 is divided into two areas 70 and 72 by a transverse indicia mark 74 which may be inscribed therein any suitable manner. The number combinations for each piece are suitably inscribed in the front face areas, except if the number is zero. In such a case the area has no indicia whatsoever. For example, both areas 70 and 72 of piece 12 represent zero and area 70 of piece 24 also represents zero, since they are devoid of indicia. In all cases where the numbers one through six are to be represented in one of the areas, the numbers are inscribed by suitable indicia constituted in units of one. For example, and as here shown, each dot 76 represents a single unit, with the total number of units indicating the number in each game piece area. It will be readily apparent from Fig. 2 that area 70 of piece 52 represents the number three while area 72 represents the number four. The use of the unit system of number identification permits the child not only to readily idenitfy each number, but to learn the components thereof. For example, by reference to piece 66, it will be noted that the number six is identified by six dots arranged in two rows of three each or three rows of two each. Consequently the child begins to understand that six times one, two times three and three times two all equal six. Similar relationships are learned for all the other numbers identified by the unit system of identification.

The free end 78 of each number-indicia area 70 and 72 is coded by means of a configuration which is related to the number indicia of the associated area. In the present embodiment, each area which represents zero, and is therefore devoid of number indicia dots 76, is coded by means of a V-shaped recess 80 defined in its free marginal end 78, as will be apparent from the game pieces 12 and 24. Each area which represents the numeral six has six dots 76 and is coded by means of a triangular projection 82, at its free end 78, which is complementary to and interfits with the recess 80, as best seen on pieces 24 and 36.

Each area which represents the numeral one has one dot 76 and is coded with an angulated marginal end formation 84, as best seen on pieces 14 and 30. Each area which represents the numeral five has five dots 76 and is coded with an angulated marginal end formation 86, which is complementary to end formation 84 to interfit or mesh therewith, as best seen on pieces 34 and 62.

Each area which represents the numeral two has two dots 76 and is coded with an angulated marginal end formation 88, as best seen on pieces 28 and 38. Each area which represents the numeral four has four dots 76 and is coded with an angulated marginal end formation 90, which is complementary to end formation 88 to interfit or mesh therewith, as best seen on pieces 58 and 60.

Each area which represents the numeral three has three dots 76 and is coded with either a stepped marginal end formation 92A or a complementary stepped marginal end formation 92B, as is best seen on pieces 52 and 48.

It will be apparent from the foregoing that each numeral has an individual coded or keyed end formation which will mesh or interfit only with its complementary coded formation and with no other. Furthermore, it will be noted from Fig. 3, that the bottom surface 94 of each piece is devoid of all indicia so that when the game is played, the indicia bearing front or upper surface 68 is uppermost so that the unmarked lower surface 94 is not intended to be visible during playing of the game. When two marginal end formations are correctly meshed or interfit, the indicia total of the two abutting areas will in every case be six.

In playing the game 10, the object is for each player to divest himself of all the game pieces that he has, and the first player to do so wins the game. One player, the dealer, distributes a fixed number of the game pieces one by one to each player. For the illustrated game embodiment there may be two to seven players, with the game pieces divided equally among the players, and some remaining with the dealer. The dealer then places one game piece face 68 up on a table to start the game. All the players arrange their game pieces face 68 up in front of them. Players take turns in a clockwise rotation, starting with the player to the left of the dealer.

The game proceeds as each player in turn attempts to "make a six" using one of two available indicia bearing areas, as one of two possible numbers with which to "make a six." For example, assume that the dealer has deposited piece 16 as the initial piece with which to start the game. The next player now has two opportunities to "make a six," namely by adding a six indicia area to the zero indicia area of piece 16, or by adding a four indicia area to the two indicia area of piece 16. He checks his pieces to see if he has the number needed to "make a six." If he has a piece with the needed number, he meshes it with the open end of the piece on the board. For example, as shown, piece 66 can be meshed with the right end of piece 16 or piece 56 can be meshed with the left end of piece 16. If the player makes the correct decision, the pieces will mesh or inter-fit so as to provide a self-checking feature. In this manner the player can always check his addition because it will be correct only if complementary keyed ends are inter-fit. If the player attempts to add together two numbers which do not total six, the game pieces will not mesh. This self-checking feature assures that children can play the game without supervision even when they are not sure of the number combinations, without danger of incorrect learnings. They know immediately if they are right or wrong.

The next player then tries to make a six using the open ends available on the already played pieces and one of his own pieces. Each player receives one additional piece from the dealer after his turn, whether or not he is successful in making a six, until the dealer has distributed all the pieces remaining after the original distribution at the start of the game. This means that those who make a six will continue with the original number of pieces, until all of the original number of undistributed pieces have been distributed. A player unable to make a six will accumulate an additional piece each time until all of the original number of undistributed pieces have been distributed. If the additional piece distributed by the dealer can be used to make a six by the player who previously had been unable to make one, he may do so without waiting for his turn to come around again. However, only one six can be made by a player during one turn.

Figure 1 represents a completely played game which started with the first piece 16 turned up by the dealer.

Since this piece has a zero at area 70 and a two at area 72, the first player will search his own pieces for those which, when added either to zero or two, will make a six. In order for him to place a piece on the table, he will need either a six or a four. If he has either of these, he places one in proper position, with the end of his piece at the end of the piece on the table, for example, using either piece 66 or 56 to mesh with the complementary end of piece 16 and if he is correct, the ends will mesh. He then receives an additional piece from the dealer and the player to his left gets his turn. If the first player does not have either a six or a four, he receives an additional piece from the dealer. If this additional piece has a six or a four, he may place it in position immediately without waiting for his turn to come around again. If the additional piece does not match, this player continues with one more piece than he originally received from the dealer. Play continues in this manner until all remaining undistributed pieces have been distributed by the dealer. After all the pieces have been distributed, play proceeds without replacements. The first player to use up all his pieces wins the game.

As illustrated in Fig. 1, the game continues serially from both free ends of the pieces already played. For example, in the play-out illustrated in Fig. 1, the following pieces have been added in series to piece 16, to the right-hand or zero end thereof, as shown by arrow 96: 66, 22, 32, 46, 18, 48, 52, 28, 60, 12, 70, 36, 44, and 50. The following pieces have been added in series to piece 16, to the left-hand or "two" end thereof, as shown by arrow 98: 56, 42, 40, 54, 20, 38, 58, 26, 64, 14, 62, 34, and 30. It will be noted that for purposes of illustration only, pieces 18 and 54 have been shown twice, it being understood that when the game is played all pieces will be placed in a single line, which may be broken at any convenient place.

It will be apparent from the foregoing that the arrangement of dots 76 leads to quick recognition of parts of a number. For example, six is represented by the six dots, as shown on piece 66, which can be recognized as two groups of three dots or three groups of two dots. In the illustrated game, the child learns to recognize all the combinations of numbers which add together to make six, both as he learns to name the two halves of each piece and as he matches ends to make sixes. In learning the combinations in the described manner, the child learns all the addition, subtraction, multiplication and division facts contained up to and including the quantity six.

While the game 10 has been illustrated and described in connection with the quantity six, it will be understood that it is not limited thereto and can be arranged for the learning of any desired number quantity by providing all the necessary pieces. For example, to "make sevens," there must be added to the basic pieces for the described game of "make sixes," the following pieces:

$$\frac{0}{7}, \frac{1}{7}, \frac{2}{7}, \frac{3}{7}, \frac{4}{7}, \frac{5}{7}, \frac{6}{7}, \frac{7}{7}$$

To "make eights," the following pieces must be added to the game of "make sevens":

$$\frac{0}{8}, \frac{1}{8}, \frac{2}{8}, \frac{3}{8}, \frac{4}{8}, \frac{5}{8}, \frac{6}{8}, \frac{7}{8}, \frac{8}{8}$$

To "make nines" the following pieces must be added to the game of "make eights":

$$\frac{0}{9}, \frac{1}{9}, \frac{2}{9}, \frac{3}{9}, \frac{4}{9}, \frac{5}{9}, \frac{6}{9}, \frac{7}{9}, \frac{8}{9}, \frac{9}{9}$$

To "make tens," the following pieces must be added to the game of "make nines":

$$\frac{0}{10}, \frac{1}{10}, \frac{2}{10}, \frac{3}{10}, \frac{4}{10}, \frac{5}{10}, \frac{6}{10}, \frac{7}{10}, \frac{8}{10}, \frac{9}{10}, \frac{10}{10}$$

It will be understood that in each case, the game pieces will be coded so that the indicia associated with complementary keyed ends will always add up to the total sum represented by the game. For example, in the illustrated embodiment, the indicia of complementary keyed ends always total six, it being understood that a blank area 70 or 72, as in the case of piece 12, is the indicia for the number or quantity zero. In the game of "making sevens," the indicia of complementary keyed ends always total seven. In the game of "making eights," the indicia of complementary keyed ends always total eight. In the game of "making nines," the indicia of complementary keyed ends always total nine. In the game of "making tens," the indicia of complementary keyed ends always total ten. In the same manner, in every game set, the indicia associated with complementary ends will always total the numerical sum represented by the game so that end keying or coding system is individual to each game set in accordance with the numerical sum represented by the game and will be different from the end keying or coding system used in the other game sets which relate to different or other numerical sums.

While I have shown and described the presently preferred embodiments of my invention, it will be understood that it is capable of many modifications and that changes may be made in the construction and arrangement thereof without departing from the spirit and scope of the invention as disclosed in the appended claims.

I claim:

1. A game device for learning the arithmetical facts relating to a predetermined numerical quantity comprising a pulrality of game pieces, each piece having a number indicia thereon associated respectively with each of the opposite ends thereof, each end having a conformation which is individual to the numerical value of its associated number indicia, and the conformation of each end being complementary only to those end conformations of other pieces which have an associated number indicia which is a numerical complement for attaining therewith said predetermined quantity by the addition of the associated number indicia of two complementary meshed ends of two of said game pieces.

2. A game device for learning the arithmetical facts relating to a predetermined numerical quantity comprising a plurality of game pieces, each piece having a number indicia thereon associated respectively with each of the opposite ends thereof, each end having a conformation which is individual to the numerical value of its associated number indicia, and the conformation of each end being complementary only to those end conformations of other pieces which have an associated number indicia which is a numerical complement for attaining therewith said predetermined quantity by the addition of the associated number indicia of two complementary meshed ends of two of said game pieces, each game piece being an elongated member and the number indicia being provided on one surface only thereof.

3. A game device for learning the arithmetical facts relating to a predetermined numerical quantity comprising a plurality of elongated game pieces, one surface of each piece being divided into two surface areas, each of which is provided with a number indicia having a numerical value up to said predetermined quantity, each area terminating in a marginal end having a conformation coded in accordance with the number indicia thereof, there being a coded conformation individual to each numerical value from zero through and including said predetermined quantity, and each coded conformation being complementary only to a coded conformation having a number indicia which, when added to the number indicia thereof, will total said predetermined quantity.

4. A game device for learning the arithmetical facts relating to a predetermined numerical quantity comprising a plurality of elongated game pieces, one surface of each piece being divided into two surface areas, each of which is provided with a number indicia having a numerical value up to said predetermined quantity, each area terminating in a marginal end having a conformation coded in accordance with the number indicia thereof, there being a coded conformation individual to each numerical value from zero through and including said predetermined quantity, and each coded conformation being complementary only to a coded conformation having a number indicia which, when added to the number indicia thereof, will total said predetermined numerical quantity, said marginal end conformations adapting each piece for meshing at each end thereof with the end of another piece having a complementary conformation to provide a plurality of game pieces disposed in series relation, the total of the numerical values of two indicia separated by a pair of meshed complementary end conformations being in all cases equal to said predetermined numerical quantity.

5. A game device, as defined in claim 4, for the numerical quantity six, having twenty-eight game pieces, respectively provided with the following indicia values:

$$\frac{0}{0}, \frac{0}{1}, \frac{1}{1}, \frac{0}{2}, \frac{1}{2}, \frac{2}{2}, \frac{0}{3}, \frac{1}{3}, \frac{2}{3}, \frac{3}{3}, \frac{0}{4}, \frac{1}{4}, \frac{2}{4}, \frac{3}{4}$$

$$\frac{4}{4}, \frac{0}{5}, \frac{1}{5}, \frac{2}{5}, \frac{3}{5}, \frac{4}{5}, \frac{5}{5}, \frac{0}{6}, \frac{1}{6}, \frac{2}{6}, \frac{3}{6}, \frac{4}{6}, \frac{5}{6}, \frac{6}{6}$$

and having complementary end conformations for the numerical values 0 and 6, 1 and 5, 2 and 4, and 3 and 3.

References Cited in the file of this patent

UNITED STATES PATENTS

| | | |
|---|---|---|
| D. 163,085 | Bishop | May 1, 1951 |
| 683,610 | Lefler | Oct. 1, 1901 |
| 777,268 | Thompson | Dec. 13, 1904 |